(12) United States Patent
Nassor et al.

(10) Patent No.: US 10,582,108 B2
(45) Date of Patent: Mar. 3, 2020

(54) METHOD AND SYSTEM FOR ENABLING CONTROL, BY A CONTROL DEVICE, OF A VIDEO CAMERA IN A VIDEO SURVEILLANCE SYSTEM

(71) Applicant: CANON KABUSHIKI KAISHA, Tokyo (JP)

(72) Inventors: Eric Nassor, Thorigné-Fouillard (FR); Naél Ouedraogo, Maure de Bretagne (FR); Jonathan Taquet, Talensac (FR)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 15/694,650

(22) Filed: Sep. 1, 2017

(65) Prior Publication Data
US 2018/0070001 A1  Mar. 8, 2018

(30) Foreign Application Priority Data
Sep. 6, 2016  (GB) .................................. 615113.6

(51) Int. Cl.
*H04N 5/232* (2006.01)
*G06K 9/00* (2006.01)
*H04N 7/18* (2006.01)

(52) U.S. Cl.
CPC ..... *H04N 5/23206* (2013.01); *G06K 9/00771* (2013.01); *H04N 7/181* (2013.01)

(58) Field of Classification Search
CPC . H04N 5/23206; H04N 7/181; G06K 9/00771

USPC .................................................. 348/159, 148
See application file for complete search history.

(56) References Cited

U.S. PATENT DOCUMENTS

| | | | |
|---|---|---|---|
| 2013/0198816 A1 | 8/2013 | Bohli et al. | |
| 2014/0211018 A1 | 7/2014 | De Lima | |
| 2015/0350520 A1* | 12/2015 | Yamashita | G06F 21/36 348/207.11 |
| 2016/0219214 A1 | 7/2016 | Bostick et al. | |

FOREIGN PATENT DOCUMENTS

| | | |
|---|---|---|
| CN | 103414881 A | 11/2013 |
| EP | 2950570 A1 | 12/2015 |
| KR | 1020140124289 A | 10/2014 |
| WO | WO2016/026314 A1 | 2/2016 |

* cited by examiner

*Primary Examiner* — On S Mung
(74) *Attorney, Agent, or Firm* — Canon U.S.A., Inc. IP Division (57) ABSTRACT

A method for enabling control, by a control device, of a video camera in a video surveillance system comprising a plurality of video cameras is disclosed. According to the method, first a signature of the control device is obtained from the control device. Information corresponding to the signature of the control device from a video stream generated by a video camera of the system is identified, and the control device is associated with the video camera that generated the video stream in which information corresponding to the signature of the control device has been identified, thereby enabling control of the video camera by the control device.

13 Claims, 9 Drawing Sheets

METHOD AND SYSTEM FOR ENABLING CONTROL, BY A CONTROL DEVICE, OF A VIDEO CAMERA IN A VIDEO SURVEILLANCE SYSTEM

TECHNICAL FIELD

This invention relates to the field of video-surveillance and more particularly to the control of a video camera that may be not easily physically accessible, or that may be difficult to identify among video-cameras of a video-surveillance system.

CROSS REFERENCE TO RELATED APPLICATION

This application claims the benefit under 35 U.S.C. § 119(a)-(d) of United Kingdom Patent Application No. 1615113.6, filed on 6 Sep. 2016 and entitled "Method and system for enabling control, by a control device, of a video camera in a video surveillance system". The above cited patent application is incorporated herein by reference in its entirety.

BACKGROUND ART

Video-surveillance is a fast growing market which tends to become increasingly widespread for ubiquitous applications. It is used in various contexts such as crime prevention, public areas security purposes, or traffic monitoring.

The control of a video-camera is required at the installation of a video surveillance system, or on the fly, for example to adapt an initial configuration of the video-camera. Physical and logical settings can be concerned by the configuration. When physical settings are adjusted, they usually entail a modification of the field of view of the video-camera and as a consequence, a modification of the captured scene. Physical settings include the pan, i.e., the horizontal angular position of the video-camera, the tilt, i.e., its vertical angular position, and the focal length which has a direct impact on the zoom. The configuration can also concern logical parameters such as the resolution (e.g., 720×480 for a standard definition or 1920×1080 for a high resolution), the frame rate (e.g. from 1 frame per second (fps) for securing parking lots to 30 fps for securing casinos), the video compression algorithm which is configured to encode and decode a digital video stream (e.g., MJPEG, MPEG-4 or H.264), the aspect ratio (e.g., 4:3 usually used for standard definition cameras or 16:9 for HDTV formats), network parameters (e.g., the source and destination IP addresses or the TCP/UDP ports) and, when required, the type of video content analysis to apply. Other settings related to video content analysis such as target tracking, motion detection or cross line detection thereby enabling the trigger of an alert may also be considered.

An operator may control a video-camera by physically accessing it, i.e. by connecting a control device to the video-camera by means of a physical cable. However, such solution is not adapted when the video-camera to control is not easily accessible, e.g., when the video-camera is high up. An alternative solution consists in configuring the video-camera from a video-surveillance center displaying multiple scenes from different cameras on multiple screens. However, the correspondence between a given scene displayed on one screen of the video-surveillance center and a given location (i.e., corresponding to the location of the video-camera generating the video stream currently displayed on the given screen) is not necessarily stored in a database of the video-surveillance system, and the association, when operated by an operator, may be difficult, particularly when the displayed scenes look similar, e.g., when they all display underground platforms.

There is thus a need to provide a method for facilitating the control of a video-camera in a video-surveillance system.

SUMMARY

To this end, the present invention first provides a method for enabling control, by a control device, of a video camera in a video surveillance system comprising a plurality of video cameras, the method comprising: obtaining from the control device a signature of the control device; identifying information corresponding to the signature of the control device from a video stream generated by a video camera of the system; and associating the control device with the video camera that generated the video stream in which information corresponding to the signature of the control device has been identified, thereby enabling control of the video camera by the control device.

In one implementation, the identification of the information comprises: detecting a movement of an object by analyzing content of a video stream generated by a video camera of the system; and comparing the detected movement with the obtained signature, the information corresponding to the signature of the control device being identified if the detected movement matches the signature of the control device.

In one implementation, the identification of the information comprises analyzing content of a video stream generated by a video camera of the system; and comparing content of at least a part of a frame of the video stream with the obtained signature, the information corresponding to the signature of the control device being identified if the compared content matches the signature of the control device.

In one implementation, the identification of the information comprises detecting changes of light intensity and/or frequency among several frames by analyzing content of a video stream generated by a video camera of the system; and, comparing the detected changes with the obtained signature, the information corresponding to the signature of the control device being identified if the detected changes matches the signature of the control device.

In one implementation, the information corresponding to the signature of the control device is a scannable image, a sequence of flashing lights or a movement In one implementation, the method further comprises receiving a geographical location of the control device, and the analyzing step is applied on video streams generated by video-cameras in the vicinity of the received geographical location. In a distributed system, it permits to reduce the number of video-cameras activating their Video Content Analytics, and in a centralized system, it permits to reduce the number of analysis that may be realized.

In one implementation, the method further comprises obtaining data for identifying and/or authenticating the control device. It permits to identify the control device when the system is configured to allow several control devices to implement the invention.

In one implementation, in response to the identifying step, acknowledgment data comprising at least one identifier of at least one video camera of the video surveillance system is sent to the control device.

In one implementation, in response to the identifying step, data for accessing the video-camera is sent to the control device.

According to a second aspect, the present invention provides a method for enabling control, by a control device, of a video camera in a video surveillance system comprising a plurality of video cameras, the method comprising, at the control device: determining an event visually detectable by a video-camera; generating a signature of the control device based on the determined event; transmitting the signature of the control device to a controller module of the video-surveillance system; and, controlling the video camera.

In one implementation, the generating step comprises detecting a movement of the control device, and converting the detected movement into a signature.

In one implementation, the method further comprises generating a visual event related to the determined event and destined to be captured by a video-camera of the video-surveillance system.

In one implementation, the control device is connected to the video-surveillance system through a wireless network.

In one implementation, the method further comprises transmitting data related to the geographical location of the control device.

In one implementation, the method further comprises transmitting data for identifying and/or authenticating the control device.

In one implementation, the method further comprises receiving acknowledgment data comprising at least one identifier of at least one video camera of the video surveillance system.

In one implementation, when several identifiers are received, the method further comprises: displaying a user-selectable list of cameras associated with the received identifiers on a screen of the control device; and, detecting a user selection of a video-camera of the list.

A further aspect of the invention comprises a video management device for enabling control, by a control device, of a video camera in a video surveillance system comprising a plurality of video cameras, the video management device comprising: an obtaining module for obtaining from the control device a signature of the control device; an identifying module for identifying information corresponding to the signature of the control device in a video stream generated by a video camera of the system; and an associating module for associating the control device with the video camera that generated the video stream in which information corresponding to the signature of the control device has been identified, thereby enabling control of the video camera by the control device.

A further aspect of the invention comprises a control device for enabling control of a video camera in a video surveillance system comprising a plurality of video cameras, the device comprising: a determining module for determining an event visually detectable by a video-camera; a generating module for generating a signature of the control device based on the determined event; a transmission module for transmitting the signature of the control device to the video-surveillance system; and, a controlling module for controlling the video camera to the video-surveillance system.

Embodiments of the present invention also extend to programs which, when run on a computer or processor, cause the computer or processor to carry out the method described above or which, when loaded into a programmable system, cause that system to become the system described above. The program may be provided by itself, or carried by a carrier medium. The carrier medium may be a storage or recording medium, or it may be a transmission medium such as a signal. A program embodying the present invention may be transitory or non-transitory.

DETAILED DESCRIPTION OF THE EMBODIMENTS

Figure 1:
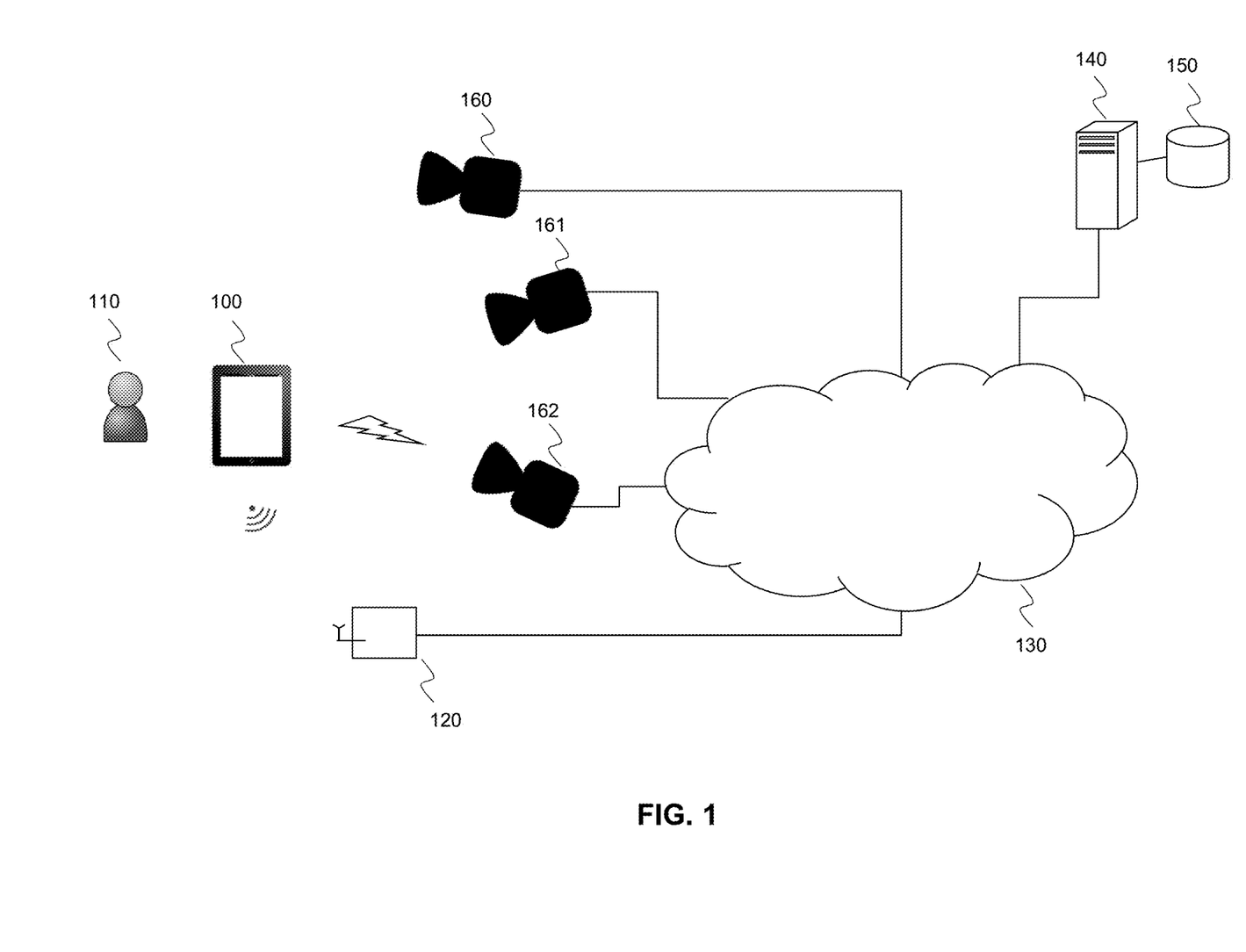
FIG. 1 depicts for illustrative purposes a video-surveillance system in which the invention is applicable.

FIG. 1 represents an example of a video-surveillance system in which the invention is applicable. A user 110 has a control device 100 for controlling a video-camera of the video-surveillance system. The control device 100 may be a mobile phone, a personal digital assistant, a game device, a portable electronic device, a watch, a tablet computer or any other device capable of being held or worn by the user. The control device 100 is typically equipped with sensors such as a gyroscope or an accelerometer, and a screen to display images, text, videos or a control user interface. The control user interface may be implemented through a web browser or a dedicated mobile application. The control device 100 may also be configured to emit light through a flash or light-emitting diodes (LED) which are embedded inside the control device or connected to the control device via a USB port or a wireless connection. The control device 100 may wirelessly access a network access point 120, using a mobile phone network (e.g., GPRS, EDGE or LTE) or a local area wireless network (e.g., 802.11n, ac, Wifi). The access point is also connected to a local network 130, which enables the control device to communicate with several remote devices. When required, a control device authentication may be used to authorize the control device 100 for logging into secure locations and resources connected to the local network 130 (e.g., using a login and password).

A video management server (VMS) 140 which manages several network video-cameras (e.g., 160, 161 and 162) is connected to the local network 130. It can be configured to collect videos from the video-cameras; record those videos to a storage device 150; analyze content of those videos; provide an interface to view both live and recorded videos; and dispatch control messages between video-cameras and other devices of the video-surveillance system.

Each network video-camera 160, 161 and 162 has an image sensor allowing to capture images and is also connected to the local network 130. It has a CPU allowing to encode the images and transmit the encoded images to the local network 130. It can receive control messages from the network to modify its physical settings and logical parameters. It may contain some simple analytic functions to analyze the scene captured and detect some simple events such as a flashlight or a specific motion. Alternatively, these analytic functions may be implemented by the VMS.

Figure 2:
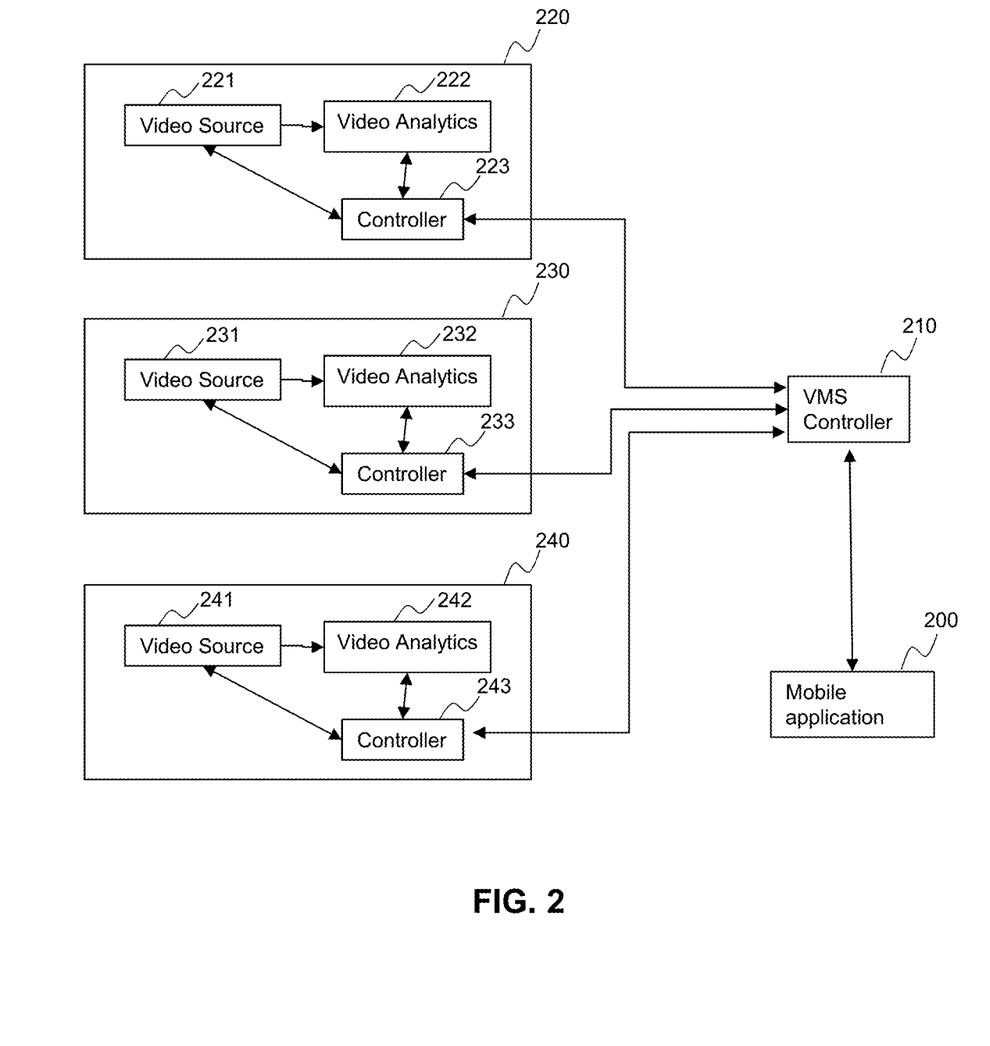
FIG. 2 illustrates a functional block diagram of a video-surveillance system.

FIG. 2 illustrates a functional block diagram of the video-surveillance system illustrated in FIG. 1.

A mobile application 200 is launched by the user 110 on his control device 100. It can be a dedicated application or a web browser running a web application. The application 200 is configured to communicate with a VMS controller module 210. In a centralized system architecture, the VMS controller module is embedded in the VMS 140, and the mobile application 200 can connect and interact with it using a Uniform Resource Locator (URL). Alternatively, the user can directly enter the URL in the web browser of its control device. In a distributed system architecture, the VMS controller module is embedded in at least one network video-camera of the video-surveillance system. When several video-cameras embed a VMS controller module, one of them is selected randomly to act as a controller when the mobile application sends a first request.

The VMS controller module is in charge of sending requests to video-cameras of the video-surveillance system, centralizing responses from them, and sending an aggregated information to the mobile application.

Each video-camera 160 (resp. 161, 162) of the video-surveillance system is controlled by a processing module 220 (resp. 230, 240). Each processing module comprises a video source module 221 (resp. 231, 241) which is configured to control the acquisition of images, their compression and the transmission of a video stream composed of several sequenced images.

Each processing module also comprises a video content analysis (VCA) module 222 (resp. 232, 242) which receives the video-stream at the output of the video source module, and analyses its content. Many different functionalities can be implemented in the VCA module 222. Video motion detection is one of the simplest functionalities where motion is detected with regard to a fixed background scene. More advanced functionalities include shape recognition, motion detection, person identification and tracking, or license plate recognition.

Each processing module also comprises a controller module 223 (resp. 233, 243) that controls the associated video source and VCA modules: the controller module 223 can start and stop the modules and control different parameters (such as the capture or compression parameters), and select which video analytics algorithm should be executed.

In a centralized system architecture, the VCA and controller modules are executed by the VMS server 140 and they communicate with the video source module placed on the video-camera through the local network 130. In a distributed system architecture, the VCA and the controller modules are embedded in the network video-cameras. The controller module then communicates with the VMS controller through the local network 130. This latter architecture requires more CPU and memory inside the network video-camera but also provides a more flexible system, i.e., easier to extend by adding new video-cameras.

According to a first embodiment (illustrated by FIG. 3a), the user 110 needs to control a video-camera of the video-surveillance system. However, the video-camera is not easy to access and to identify, although he is just located in front of it. The user 110 uses a mobile application of the control device 100, e.g. smartphone, to detect movements. The user realizes a particular movement (e.g., three consecutive "0" gestures) with the smartphone in his hand. The mobile application converts the detected movement into a control device signature which is transmitted to the video-surveillance system using a wireless network. Since each video-camera embeds a VCA configured to detect movements, the one that detects the particular movement defined by the received control device signature (e.g., three consecutives "O" gestures) is the video-camera the user wants to control. Once the VCAs settings are configured using the received control device signature, the user reproduces the three consecutives "O" gestures, and the one that detects the sequence is the video-camera the user wants to control.

According to a second embodiment (illustrated by FIG. 3b), the user 110 uses a mobile application of its smartphone 100 to determine a particular sequence of flashlights (e.g., two short and one long flashes). The mobile application converts the determined sequence into a control device signature (e.g., similarly to the Morse code) which is transmitted to the video-surveillance system using a wireless network. Since each video-camera embeds a VCA configured to detect a particular sequence of flashlights related to the transmitted control device signature, the one that detects the sequence is the video-camera the user wants to control.

According to a third embodiment (illustrated by FIG. 7a), a control request is transmitted to the video-surveillance system thereby enabling the recording of the video streams generated by each video-camera. The user 110, which is located in the field of view of a video-camera, uses a mobile application of its smartphone 100 that is configured to detect movements. The user realizes a particular movement (e.g., three consecutive "O" gestures) with the smartphone in his hand. The mobile application converts the detected movement into a control device signature which is transmitted to the video-surveillance system using a wireless network. On receipt of the signature, each VCA embedded in a video-camera analyzes the recorded streams, and the one that embeds the particular movement (e.g., three consecutives "O" gestures) is the video-camera the user wants to control.

Figure 3A:
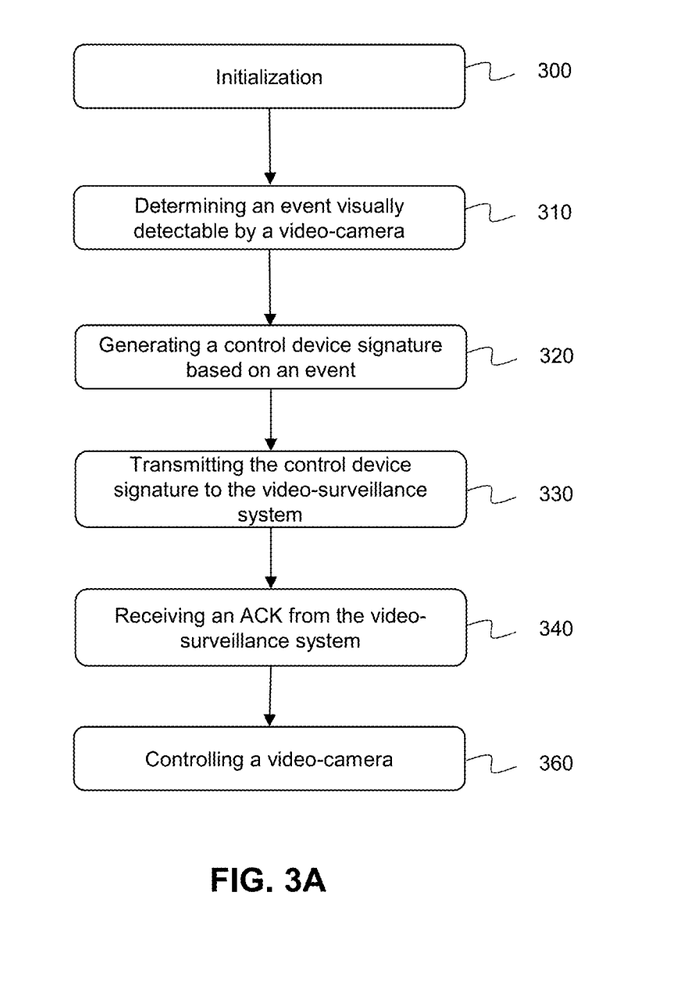
FIGS. 3a-3c are flowcharts of an algorithm for connecting a controlling device with a video-camera according to an embodiment of the invention.

FIG. 3a is a flowchart of an algorithm for connecting a control device with a video-camera according to the first embodiment of the invention.

Step 300 corresponds to an initialization step where the mobile application 200 connects to the VMS server 140. Firstly, a communication between the control device and the local network is established: the user turns on wireless connectivity on its control device which connects to the access point 120. Then, a network authentication process is launched, for example using a login and password.

In the following, we consider that the URL to connect to the VMS server and the associated authentication means (e.g., login and password) are known by the user. To connect to the VMS server, the user enters the URL of the server in the web-browser of its control device. When required, a VMS authentication process is launched (e.g., using a login and a password which may be locally hashed). The corresponding authentication step at the VMS server side is detailed in step 410 of FIG. 4. Alternatively, the user only selects a mobile application 200 of its control device which directly connects to the VMS server. At the end of step 300, the mobile application is connected, authorized and can send and receive information from the VMS server.

At step 310, an event which is visually detectable by a video-camera of the video-surveillance network is determined and made by the user. Since the event must be detectable by a VCA 222 (resp. 232, 242) of the video-surveillance system, it is determined based on the VCAs capabilities. A dedicated mobile application 200 can be launched by the user 110 to determine the event.

According to an embodiment, the event is a specific movement made with hands or body. For example, a motion in the form of an "O" gesture, a rotation to the left or to the right, or a sequence of extension/flexion of the wrist while the right arm is up.

At step 320, a control device signature is generated based on the movement previously made, i.e., the specific movement is converted (encoded) into a signal usable by the mobile application 200. The mobile application 200 is then configured to recognize movements of the user or of the control device, and to that end, the control device comprises an x-axis accelerometer that detects movement of the device along an x-axis, an y-axis accelerometer that detects movement of the device along an y-axis, and an z-axis accelerometer that detects movement of the device along an z-axis. In combination, the three accelerometers are able to detect rotation and translation of control device 100. The control device 100 can additionally include gyros which increase accuracy in detecting movement of control device 100, when used in combination with the accelerometers. The data set of points corresponding to the detected movement corresponds to a control device signature. In some cases, a control device signature corresponds to some hash of a data set of points corresponding to a detected movement.

At step 330, the control device signature generated at step 320 is transmitted to a device of the video-surveillance system (e.g., the VMS controller 210), for example using the wireless network. The mobile application 200 sends a control request to the VMS server 140. This request contains the control device signature and a Uniform Resource Identifier (URI) which will be used by the video-surveillance system to transmit requests and/or control messages to the mobile application. The URI is useful to configure the channel for communication between the video-camera and the mobile application. It is particularly relevant for the video-surveillance system to obtain this URI when several users can connect to several video-cameras simultaneously. The URI can be:
- the IP address of the control device and a port number listen by the mobile application;
- the login used at step 300 for connecting to the VMS server;
- a descriptor of a wireless network (e.g., a Service Set Identifier) which is activated by the control device to receive requests / control messages of the video-camera.

In the particular case where only one mobile application is authorized to connect simultaneously to the VMS server, the URI can be skipped. Optionally, the request can also contain a position indication, e.g., geographical coordinates provided by a dedicated application of the control device, or the identifier of the access point 120 used by the control device to connect the local network 130. The request sent in step 330 is received by the VMS server at step 420 of FIG. 4.

When receiving the request, the VMS controller forward the request to the video content analysis module(s) that obtain the visual event to detect. Then the user 110, which is located in the field of view (possibly in front) of the video-camera he wants to control, reproduces the movement determined and made at step 310. This can be done in response to the reception of a control message from the video-surveillance system indicating that the VCAs are ready to detect a visual event associated with the control device signature (step 340). Finally, step 360 corresponds to a controlling step that is detailed at FIG. 3c.

Figure 3B:
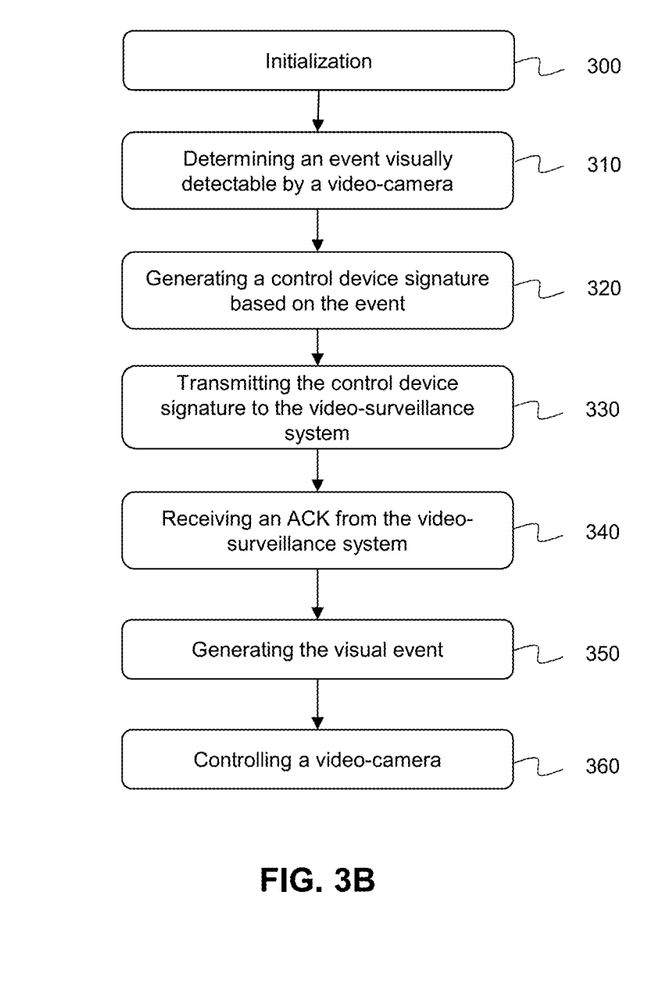

FIG. 3b is a flowchart of an algorithm for connecting a control device with a video-camera according to a second embodiment of the invention where the event to detect is a visual event generated by the control device 100. The event can correspond to a sequence of light pulses generated by a flash or LEDs of the control device. The variation of the intensity of the generated light can also be considered. Depending on the expected frame rate of the video-cameras and the characteristics of the LED, the intensity variation may be faster or slower. For example, if a capture of 60 frame per second is expected, the led could be changed 30 time per seconds. If the device has several LEDs, more complex signals can be used by varying the intensity of the LEDs at different rates. It is also possible to use LEDs with varying colors. Alternatively, the light can be a laser light. It offers the advantage to allow the user to precisely select a video-camera or a target field of view located at a long distance. Alternatively, the light can be an infra-red light. It offers the advantage of not being visible from other persons, and the infra-red light can be captured by most network video-camera image sensors. Alternatively, the visual information is a scannable image or code (i.e., an optical machine-readable representation of data) such as a 2D barcode or a linear barcode displayed on the screen of the control device 100, or a text.

The user configures a desired visual information through its mobile application (step 310). Since the event must be detectable by a VCA 222 (resp. 232, 242) of the video-surveillance system, it is determined based on the VCAs capabilities.

At step 320, a control device signature is generated based on the visual information determined at step 310, and transmitted to the video-surveillance system using the wireless network (step 330).

At step 350, the control device generates the visual information configured at step 310. This step can be launched in response to the reception of a control message from the video-surveillance system indicating that the VCAs are ready to detect an event associated with the control device signature (step 340).

Ideally, the user is located in the field of view (possibly in front) of the video-camera he wants to control. But the user can also be positioned near the field of view of the camera so that a reflection of the emitted light can still be captured by the video-camera. The module configured to generate the visual information can be embedded in the control device 100, but it may be also a separate device connected to the control device either by a wire or a wireless connection, so that the control application can control the visual signal generating device. Finally, step 360 corresponds to a controlling step that is detailed at FIG. 3c.

Figure 3C:
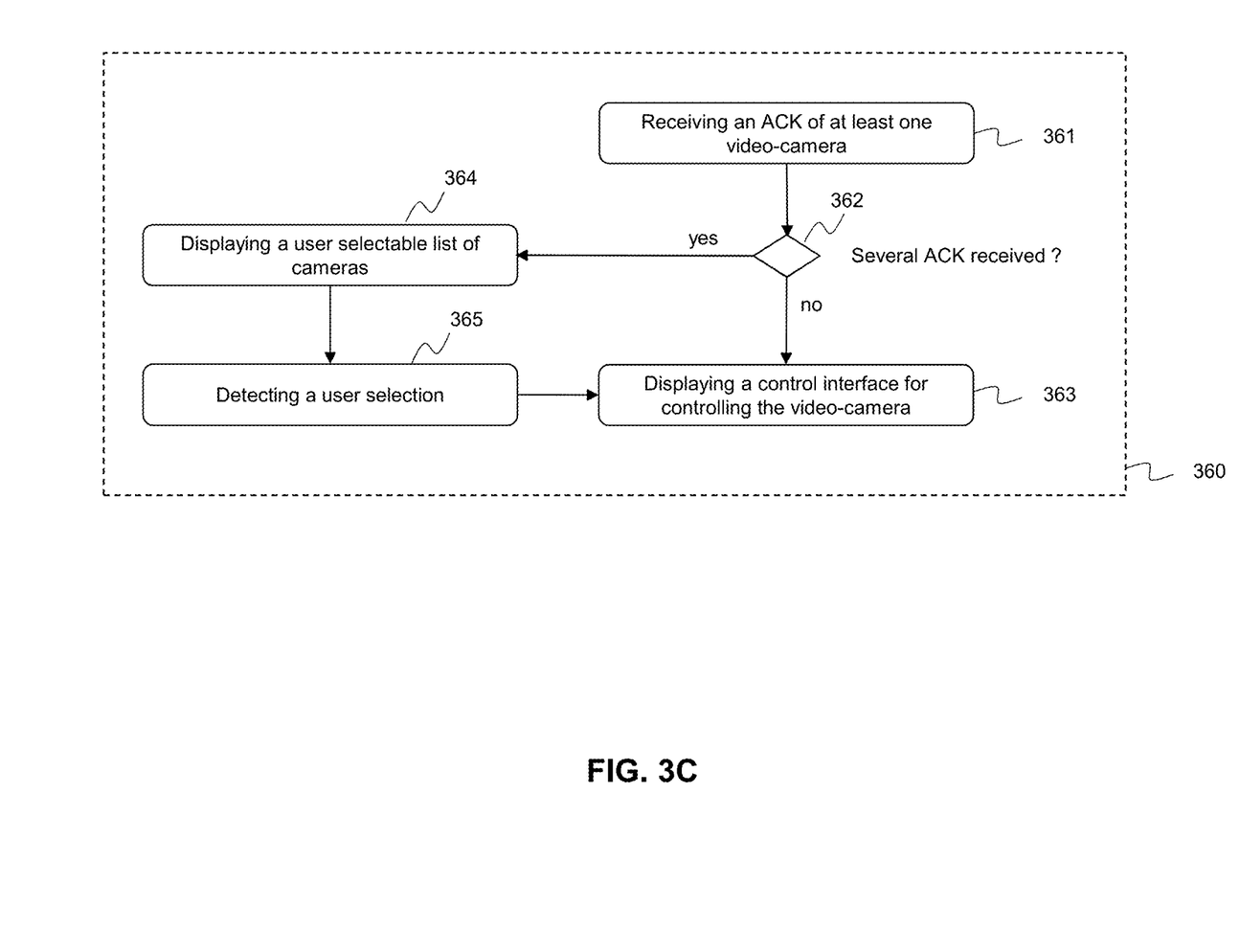

FIG. 3c is a flowchart illustrating step 360 of FIG. 3a with further details. If at least one video-camera acknowledgment is received, i.e., indicating that a VCA associated with a video-camera has detected the determined event (step 361), the mobile application waits a predetermined interval of time to determine if several acknowledgments are received from several video-cameras (step 362). Alternatively, a control message comprising the identifiers of video-cameras that have detected the event is received.

This situation can occur when several video-cameras have overlapping field of views. Moreover, if indirect light is used, several video-cameras may detect different reflected lights. In this case, the same visual event can be captured by several cameras, and the mobile application can be configured to display information associated with each video-camera that has detected the visual event (step 364). The displayed information can be an identifier of each video-camera, a captured image or their live stream. In this way, the user can select one of the video-cameras (step 345).

When only one camera request is received in step 362, or after the selection of one video-camera in step 365, the mobile application displays a control interface at step 363. The control interface allows the user to select different functions related to the selected video-camera: the user can modify its physical and/or logical settings. He can also activate or deactivate the recording of the video stream. The user can also activate or deactivate or change the parameters of some video analytics of the VCA (222, 232, 242) associated with the selected video-camera.

Some functions can be directly controlled by the mobile application 200 which sends an order to the controller module (223, 233, 243) of the selected camera. The mobile application can also send control messages to the VMS controller 210 with an identifier of the selected camera in order to select a function related to the selected camera. For example, the user can ask to view a previously recorded video from the selected video-camera. The video is stored in the database 150, and the VMS controller can access the database and sends the video to the mobile application.

Figure 4:
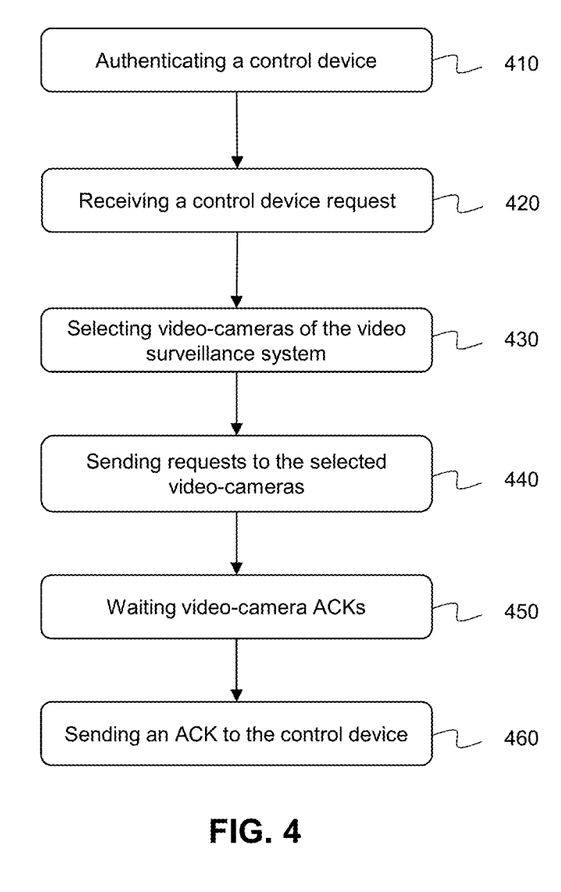
FIG. 4 is a flowchart of an algorithm executed by a video management server according to an embodiment of the invention.

FIG. 4 is a flowchart of an algorithm executed by a video management server (possibly the VMS controller 210) according to an embodiment of the invention.

In a first step 410, the VMS server authenticates the control device. According to an embodiment, a request comprising a login and a hashed password is received, and the VMS server checks if the corresponding user is allowed to control a video-camera of the video-surveillance system. Alternatively, the request comprises the MAC address of the control device or data stored in the control device such as a cookie stored in a previous web session. More secure connections can also be established using an encrypted communication channel (e.g., using https based on the TLS protocol).

According to an embodiment, at step 420, the VMS server receives a control request from the control device. Such request (described at step 330 of FIG. 3a) comprises a control device signature, and optionally a Uniform Resource Identifier (URI) and a position indication.

At step 430, the server selects a set of target video-cameras. By default, all video-cameras of the video-surveillance system are selected. In some cases, the VMS server selects a subset of video-cameras of the video-surveillance system by only selecting video-cameras that the given user is allowed to control. Alternatively, the VMS server only selects the video-cameras in the vicinity of the user, based on the position indication received at step 420.

When the set of video-cameras is selected, the VMS server sends a request to all target video-camera controllers (223, 233 and 243) of the set (step 440). The request comprises the control device signature and the URI received in step 420. The request will trigger a camera controller process illustrated by FIG. 5.

Then the VMS server receives acknowledgments from all target video-cameras of the set, indicating that they have correctly activated their corresponding VCA (step 450).

At step 460, the server sends a message to the mobile application indicating that the VCAs are activated and ready to detect a predetermined event. The message is received in step 340 of FIG. 3a.

Following this process, the VMS server may be involved in some embodiments only:

When the requests are transmitted through the VMS server, it is necessary to route video-camera requests from a video-camera to a mobile application. In that case, the VMS server analyses the video-camera request that comprises a control device ID, and transmit the video-camera request to the corresponding control device. The usage of the control device ID offers the advantage to allow several users/control devices to connect simultaneously to the video-surveillance system. However, if only one control device is allowed to make a connection request at a time, it is not necessary to transmit the control device ID in requests received at step 420 and transmitted to the video-cameras at step 440. In this case, the video-camera requests are systematically sent to the unique connected control device.

When a controlling a video-camera (step 363), the control device sends a request to the VMS server containing a camera identifier (previously received at step 361). According to an embodiment, the request is transmitted to the video-camera controller associated with the corresponding video-camera. Alternatively, the request is handled by the VMS controller 210, for example, to access a video captured by the corresponding video-camera and stored in the database 151.

Figure 5A:
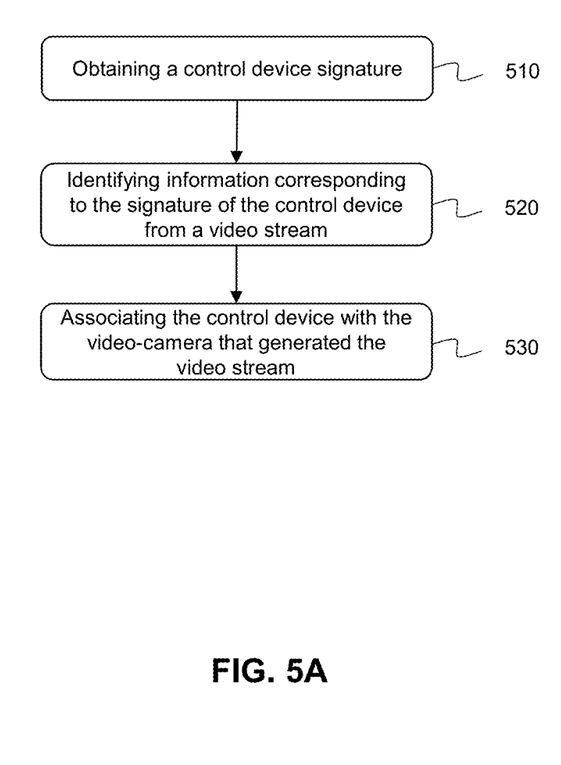
FIGS. 5a and 5b are flowcharts of an algorithm executed by a video-camera controller module according to an embodiment of the invention.

FIG. 5a is a flowchart of an algorithm executed by a video-camera according to an embodiment of the invention.

At step 510, a control device signature is obtained (from step 330).

At step 520, a signature similar to (or that matches) the signature of the control device is identified in a video stream generated by a video camera of the video-surveillance system.

Finally, at step 530, the control device (associated with the control device signature) is associated with the video camera that generated the video stream.

Figure 5B:
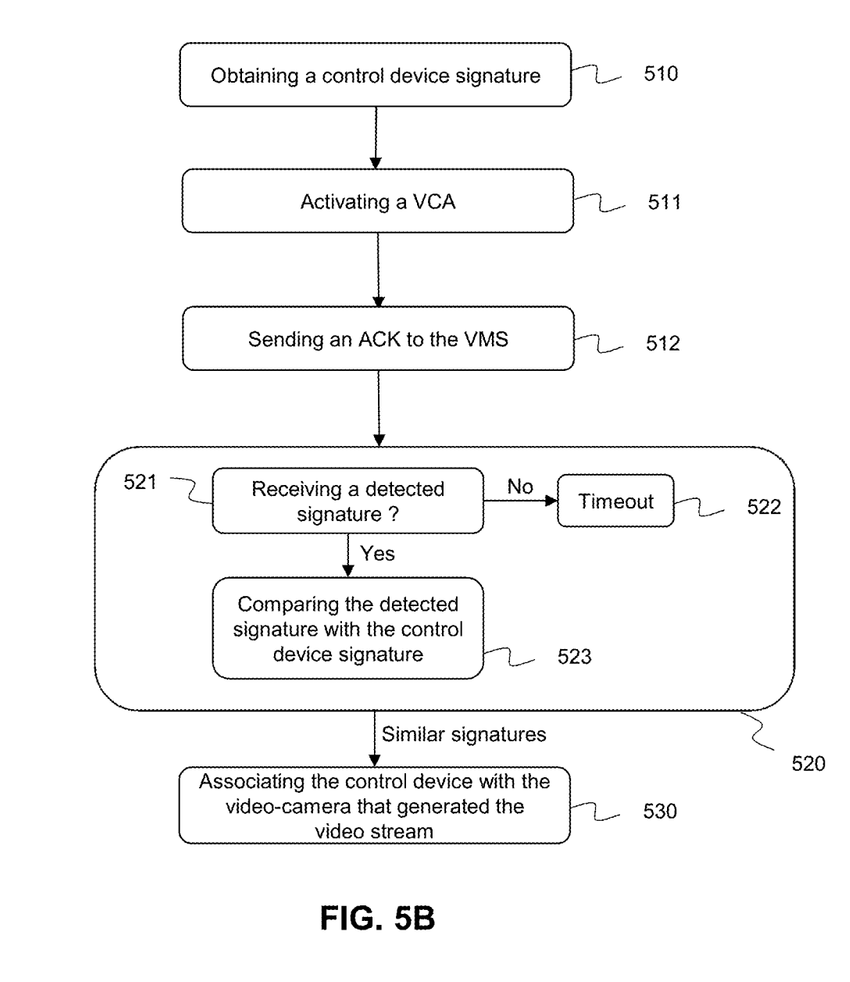

FIG. 5b is a flowchart which illustrates the algorithm of FIG. 5a with further details.

According to an embodiment, step 510 corresponds to the reception of a request (transmitted by a control device at step 330) that comprises a control device signature and a URI. In response to the reception of the request, the video-camera controller module activates a VCA module described in FIG. 6 (step 511).

When the VCA is launched, the video-camera controller module sends an acknowledgement to the VMS controller indicating that the video-camera is ready (step 512).

Step 520 comprises steps 521, 522 and 523. At step 521, the VCA informs the video-camera controller module that a control device signature has been detected in a video stream. If no message is received from the VCA after a predetermined amount of time (e.g., 30s) a timeout is triggered (step 522), and the VCAs are deactivated.

Going back to step 521, the detected control device signature is compared with the control device signature obtained at step 510. If the signature is different, it means that the event was not correct, or that several users are trying to connect the video-surveillance system.

If the control device signatures are the same or sufficiently similar (e.g., by computing a similarity measure based on squared Euclidean distance and determining if that measure is inferior to a predetermined threshold), a positive match is detected and the controller module accesses the control device using the URI received in step 501 (step 530).

Following this connection step, the controller module sends a video-camera identifier to the mobile application (e.g. through acknowledgment messages transmitted by the VMS server to the mobile application at step 361), thus allowing the mobile application to control the video-camera which is in front of the user. The controller module can also be configured to send data for accessing the video-camera (e.g., the IP address of the video-camera), or data to control the video-camera, e.g., the address of a local web page showing a user interface to control the video-camera. Then, the controller module can receive requests from the mobile application to control the video-camera.

Figure 6:
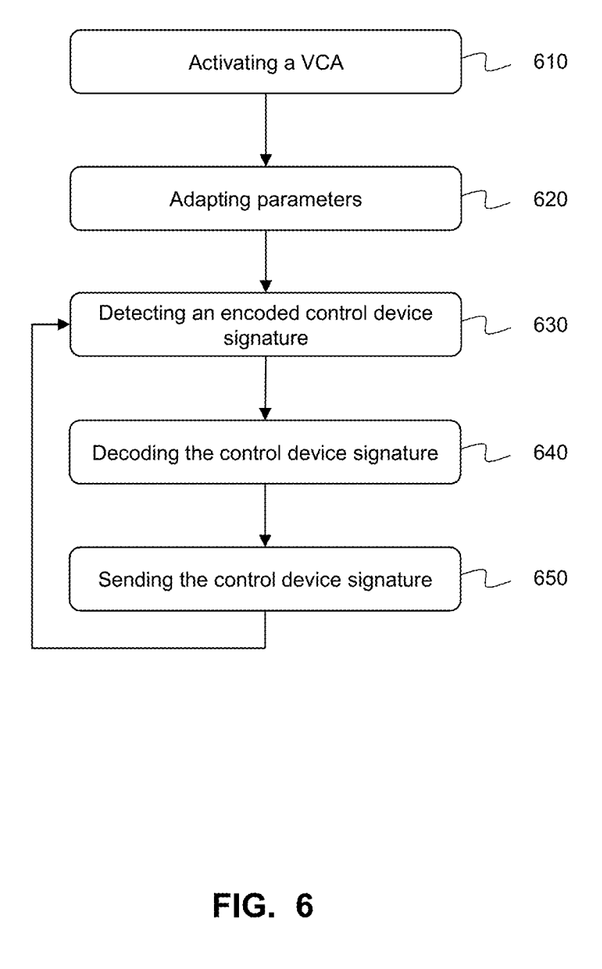
FIG. 6 is a flowchart of an algorithm executed by a video analytics module according to an embodiment of the invention.

FIG. 6 is a flowchart of an algorithm executed by a video analytics module according to an embodiment of the invention.

An activation request (transmitted by the video-camera controller module at step 511) is received at step 610. This activation request can comprise information related to the visual event to detect At step 620, the VCA adapts its settings, and parameters of the video source, so as to correctly detect the visual event The adaptation can concern:
  A resolution increase to analyze the content of the video stream more precisely;
  An increase of the frame rate;
  A removing of the infra-red filter (when the visual event is generated with a infra-red light);
  An increase the quality of the compressed video stream, when the VCA module receives a compressed video stream.

At step 630, the VCA analyzes the content of the video stream captured by the video source 221 (resp. 231, 241). Since this process can be CPU intensive, it is advantageous to limit the activation time to a predetermined duration (e.g., 20 seconds). The detection process searches a specific visual event in the sequences images of the video stream captured by the video-camera that may correspond to a movement of the user or a visual signal generated by the control device, e.g., a 2D barcode or a linear barcode detected on a frame (or a part of a frame) of the video stream, or a sequence of flashing lights detected by the VCA configured to analyze changes of light intensity and/or frequency among several frames (step 350).

When a visual event (that possibly corresponds to the event generated by the user of the mobile device) is detected, it is decoded so as to generate a signature corresponding to the detected event (step 640). At step 650, this signature is then transmitted to the controller module (and corresponds to the signature received by the controller module at step 520).

After a predetermined period of time and optionally, the VCA is stopped to limit CPU consumption. In another embodiment, the VMS server notifies the video-cameras that the control device signature was detected by another video-camera, in order to stop the analytics.

Figure 7A:
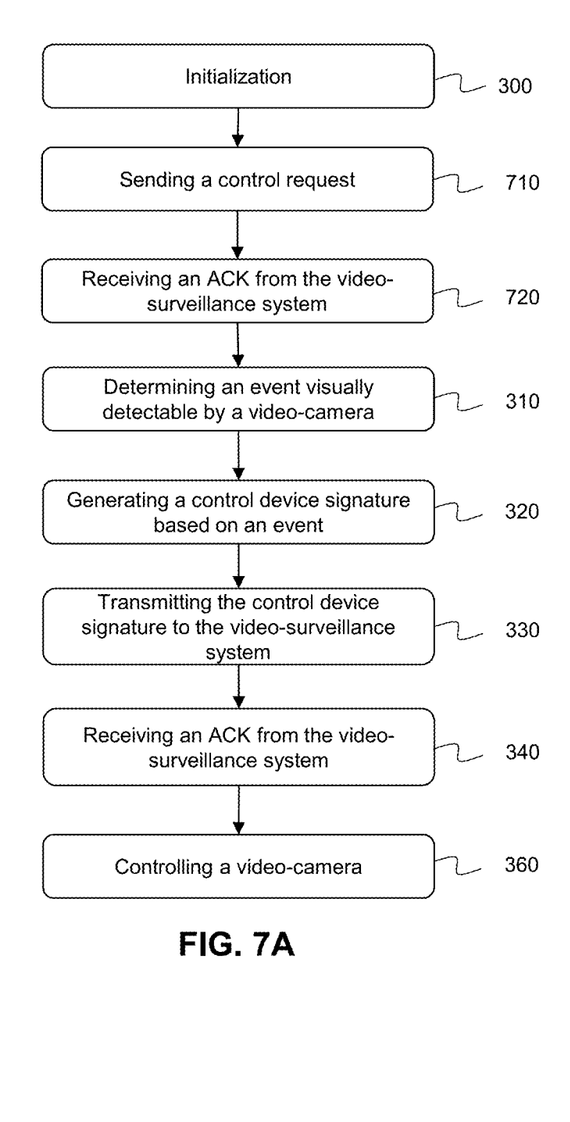
FIGS. 7a and 7b are flowcharts of an algorithm executed by a controlling device and a video camera controller according to another embodiment of the invention.

FIG. 7a is a flowchart of an algorithm executed by a controlling device according to a third embodiment of the invention.

Steps 300, 310, 320, 330, 340 and 360 correspond to those of FIGS. 3a and 3b.

At step 710, a control request is transmitted to the video-surveillance system, thereby enabling the recording of the video streams generated by each video-camera.

On receipt of an acknowledgment from the video surveillance system (step 720), the user, which is located in the field of view (possibly in front) of the video-camera, determines and makes a specific movement (step 310).

At step 320, a control device signature is generated based on the movement previously made.

At step 330, the control device signature is transmitted to the video-surveillance system, for example using the wireless network.

On receipt of the signature, each VCA embedded in a video-camera analyzes the recorded stream, and the one that detects the movement (e.g., three consecutives "O" gestures) is the video-camera,the control of which is required by the user. Finally, step 360 corresponds to a controlling step that is detailed at FIG. 3b.

Figure 7B:
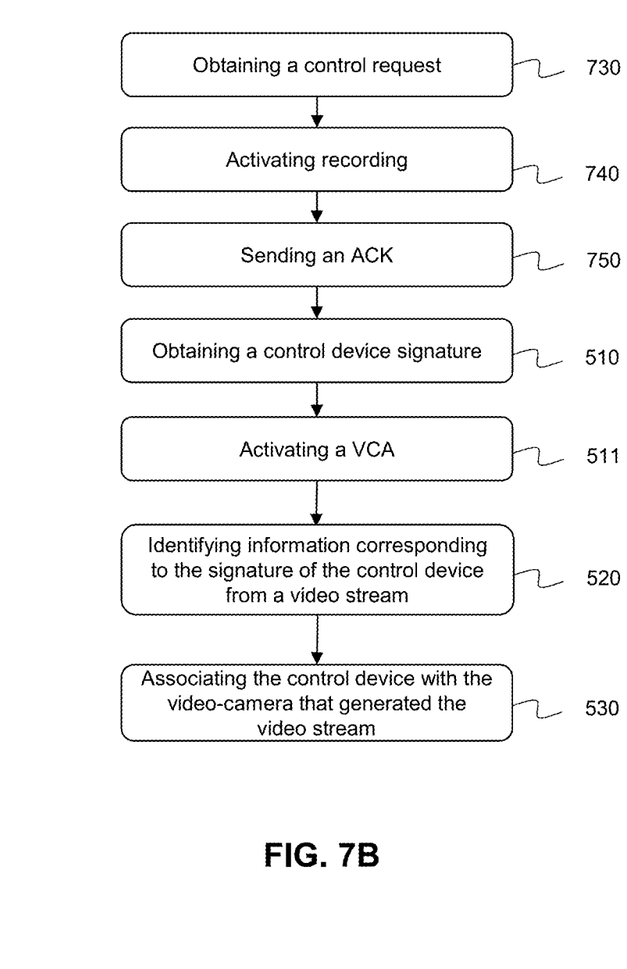

FIG. 7b is a flowchart of an algorithm executed by a video camera controller according to a third embodiment of the invention.

Steps 510, 511, 520 and 530 correspond to those of FIG. 5b.

Step 730 corresponds to the reception of a control request (transmitted by a control device at step 710) that comprises a URI. In response to the reception of the request, the video-camera controller module activates the recording the video streams generated by the video-cameras (step 740).

At step 750, the video camera controller sends an acknowledgement to the controlling device (that corresponds to the acknowledgement received at step 720) indicating that the video-surveillance system is ready to record a specific event.

Step 510 corresponds to the reception of a control device signature. In response to the reception of the signature, the video-camera controller module activates a VCA module described in FIG. 6 (step 511).

At step 520, a signature similar to the signature of the control device is identified in a video stream generated by a video camera of the video-surveillance system.

Finally, at step 530, the control device (associated with the control device signature) is associated with the video camera that generated the video stream.

Figure 8:
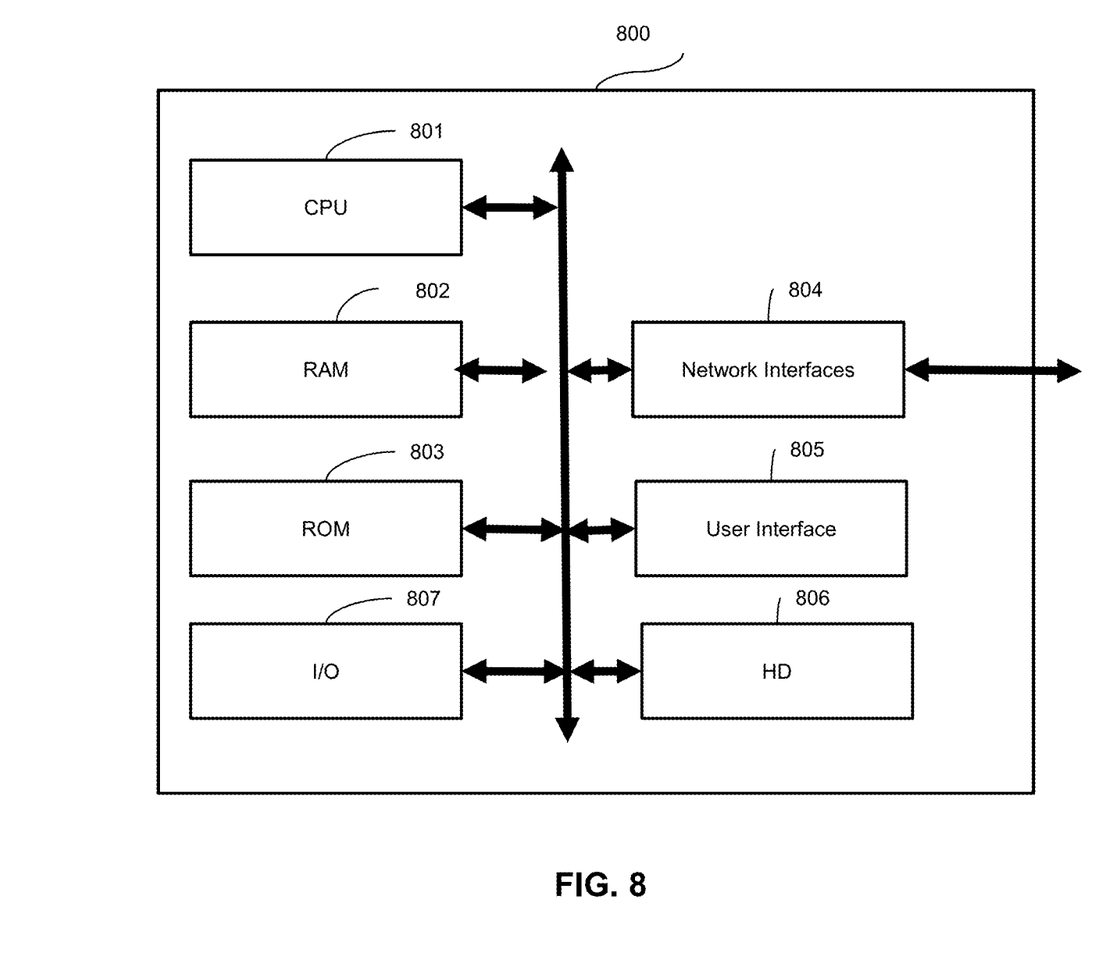
FIG. 8 illustrates a functional block diagram of a device according to an embodiment of the invention.

FIG. 8 illustrates a functional block diagram of a control device according to an embodiment of the invention.

As illustrated, the control device 800 comprises a communication bus connected to:
  a central processing unit (CPU) 801, such as a microprocessor;
  a random access memory (RAM) 802 for storing executable instructions (executable code), in particular instructions carrying out steps according to embodiments of the invention during execution as well as registers, in particular registers adapted to record variables and parameters used to implement embodiments of the invention;
  a read only memory (ROM) 803 for storing computer programs, in particular computer programs for implementing embodiments of the invention;
  a communication module 804 that is typically connected to a communication network over which digital data, in particular processed data or data to be processed, are transmitted or received;
  a user interface 805;
  a hard disk (HD) 806; and,
  an input/output (I/O) interface module 807 for receiving data from and/or for sending data to external devices.

Before being loaded into RAM 802 to be executed, an executable code is preferably stored in read only memory 803. Alternatively, it can be stored in the hard disk 806 or in a removable digital medium (not represented) such as a memory key, for example a memory key conforming to the USB (Universal Serial Bus) standard.

The central processing unit 801 is adapted to control and direct the execution of the instructions or portions of executable code of the program or programs according to embodiments of the invention, which instructions are stored in one of the aforementioned storage means. After powering on, the CPU 801 is capable of executing instructions from main RAM memory 802 relating to a software application after those instructions have been loaded from the ROM 803 or the hard-disk 806 for example.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for enabling control, by a control device, of a video camera in a video surveillance system comprising a plurality of video cameras, the method comprising:
   receiving a signature of the control device at a video management server and sending a request including the signature from the video management server to a plurality of video camera controllers, each embedded in one of the plurality of video cameras, wherein the signature is transmitted to the video management server through a wireless network from the control device;
   analyzing a video stream generated by each video camera of the plurality of video cameras that receives the signature, using a video content analysis module embedded in each respective video camera;
   identifying information corresponding to the signature of the control device in one of the generated video streams based on a result of the analysis; and
   associating the control device with the video camera that generated the video stream in which information corresponding to the signature of the control device has been identified, thereby enabling control of the video camera by the control device.

2. The method according to claim 1, wherein the identifying step comprises:
   detecting a movement of an object by analyzing content of the video stream; and,
   comparing the detected movement with the signature,
   wherein information corresponding to the signature of the control device is identified if the detected movement matches the signature of the control device.

3. The method according to claim 1, wherein the identifying step comprises:
   analyzing content of the video stream; and,
   comparing content of at least a part of a frame of the video stream with the signature,
   wherein information corresponding to the signature of the control device is identified if the compared content matches the signature of the control device.

4. The method according to claim 1, wherein the identifying step comprises:
   detecting changes of light intensity and/or frequency among several frames by analyzing content of the video-stream; and,
   comparing the detected changes with the signature,
   wherein information corresponding to the signature of the control device is identified if the detected changes match the signature of the control device.

5. The method according to claim 1, wherein the information corresponding to the signature of the control device is a scannable image, a sequence of flashing lights or a movement.

6. The method according to claim 1, wherein the receiving step further comprises receiving a geographical location of the control device, wherein the analyzing step is applied on video streams generated by video-cameras in the vicinity of the received geographical location.

7. The method according to claim 1, further comprising obtaining data for identifying and/or authenticating the control device.

8. The method according to claim 1, wherein in response to the identifying step, acknowledgment data comprising at least one identifier of at least one video camera of the video surveillance system is sent to the control device.

9. The method according to claim 1, wherein in response to the identifying step, data for accessing the video-camera is sent to the control device.

10. A video surveillance system comprising a plurality of video cameras, the video surveillance system comprising:
    video management server configured to receive a signature of the control device transmitted through a wireless network from the control device, and send a request to a plurality of video camera controllers, each embedded in one of the plurality of video cameras, wherein the request includes the signature;
    a processor in each of the video cameras that receives the signature configured to function as an analyzing and identifying module for analyzing a video stream generated by its respective video camera of the plurality of video cameras to identify information corresponding to the signature of the control device in one of the generated video streams based on a result of the analysis; and
    a processor configured to function as an associating module for associating the control device with the video camera that generated the video stream in which information corresponding to the signature of the control device has been identified, thereby enabling control of the video camera by the control device.

11. A non-transitory computer-readable medium storing a computer program which on execution by a programmable node of a video management server causes the node to execute a method for enabling control, by a control device, of a video camera in a video surveillance system comprising a plurality of video cameras, the method comprising:
    receiving a signature of the control device at the video management server, wherein the signature is transmitted through a wireless network from the control device;
    analyzing video streams generated by video cameras of the plurality of video cameras, wherein the video streams are received at the video management server;
    identifying information corresponding to the signature of the control device in one of the generated video streams based on a result of the analysis; and
    associating the control device with the video camera that generated the video stream in which information cor-responding to the signature of the control device has been identified, thereby enabling control of the video camera by the control device.

12. A method for enabling control, by a control device, of a video camera in a video surveillance system comprising a plurality of video cameras, the method comprising:
receiving a signature of the control device at a video management server, wherein the signature is transmitted through a wireless network from the control device;
analyzing video streams generated by video cameras of the plurality of video cameras, wherein the video streams are received at the video management server and analyzed by a video content analysis module executed by the video management server;
identifying information corresponding to the signature of the control device in one of the generated video streams based on a result of the analysis; and
associating the control device with the video camera that generated the video stream in which information corresponding to the signature of the control device has been identified, thereby enabling control of the video camera by the control device.

13. A video management server for enabling control, by a control device, of a video camera in a video surveillance system comprising a plurality of video cameras, the video management server comprising:
at least one processor configured to function as:
a receiving module for receiving from the control device a signature of the control device transmitted through a wireless network from the control device;
an analyzing and identifying module for analyzing video streams generated by video cameras of the plurality of video cameras and received at the video management server, and identifying information corresponding to the signature of the control device in one of the generated video streams based on a result of the analysis; and
an associating module for associating the control device with the video camera that generated the video stream in which information corresponding to the signature of the control device has been identified, thereby enabling control of the video camera by the control device.

* * * * *